(12) United States Patent
Salter et al.

(10) Patent No.: US 9,573,519 B1
(45) Date of Patent: Feb. 21, 2017

(54) ENGINE COMPARTMENT LIGHTING TO MOVING PARTS

(71) Applicant: Ford Global Technologies, LLC, Dearborn, MI (US)

(72) Inventors: Stuart C. Salter, White Lake, MI (US); Cornel Lewis Gardner, Romulus, MI (US); James J. Surman, Clinton Township, MI (US); Benjamin Yilma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/231,092

(22) Filed: Aug. 8, 2016

(51) Int. Cl.
*B60Q 1/00* (2006.01)
*B60Q 1/26* (2006.01)
*B60Q 11/00* (2006.01)
*B60Q 3/06* (2006.01)

(52) U.S. Cl.
CPC ...................................... *B60Q 3/06* (2013.01)

(58) Field of Classification Search
CPC ....................................................... B60Q 3/06
USPC ................. 362/487–488, 496, 509–510, 540
See application file for complete search history.

(56) References Cited

U.S. PATENT DOCUMENTS

| | | |
|---|---|---|
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

An illumination apparatus for a vehicle is disclosed. The illumination apparatus comprises a light source disposed proximate an engine compartment configured output an emission to illuminate a component moving at a cyclic rate. The apparatus further comprises a controller configured to selectively illuminate the light source at a lighting frequency. The lighting frequency is configured to generate a strobe effect configured to create a sampled illumination of the component.

19 Claims, 5 Drawing Sheets

(56) References Cited

U.S. PATENT DOCUMENTS

| | | |
|---|---|---|
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

ENGINE COMPARTMENT LIGHTING TO MOVING PARTS

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present disclosure, an illumination apparatus for a vehicle is disclosed. The illumination apparatus comprises a light source disposed proximate an engine compartment configured output an emission to illuminate a component moving at a cyclic rate. The apparatus further comprises a controller configured to selectively illuminate the light source at a lighting frequency. The lighting frequency is configured to generate a strobe effect configured to create a sampled illumination of the component.

According to another aspect of the present disclosure, a lighting apparatus for a vehicle is disclosed. The lighting apparatus comprises a light source disposed in an engine compartment and a controller in communication with an engine control module. The controller is configured to identify a timing detected by the engine control module. The apparatus further comprises a moving component controlled by the engine. The controller activates the light source at the component timing in a diagnostic mode.

According to yet another aspect of the present disclosure, a lighting apparatus for a vehicle is disclosed. The lighting apparatus comprises a light source disposed proximate an engine compartment. The light source is configured to output an emission to illuminate a component moving at a cyclic rate. The apparatus further comprises a controller configured to selectively illuminate the light source at a lighting frequency. The lighting frequency is configured to generate a strobe effect configured to create a sampled illumination of the component.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of an engine compartment. In some implementations, a light source may be configured to illuminate a first photoluminescent portion. The first photoluminescent portion may be disposed on a moving component of the vehicle. The light source may be configured to illuminate the moving component in a periodic emission of light. The periodic emission of light may illuminate the moving component such that a movement of the moving component is visually evident.

Figure 1:
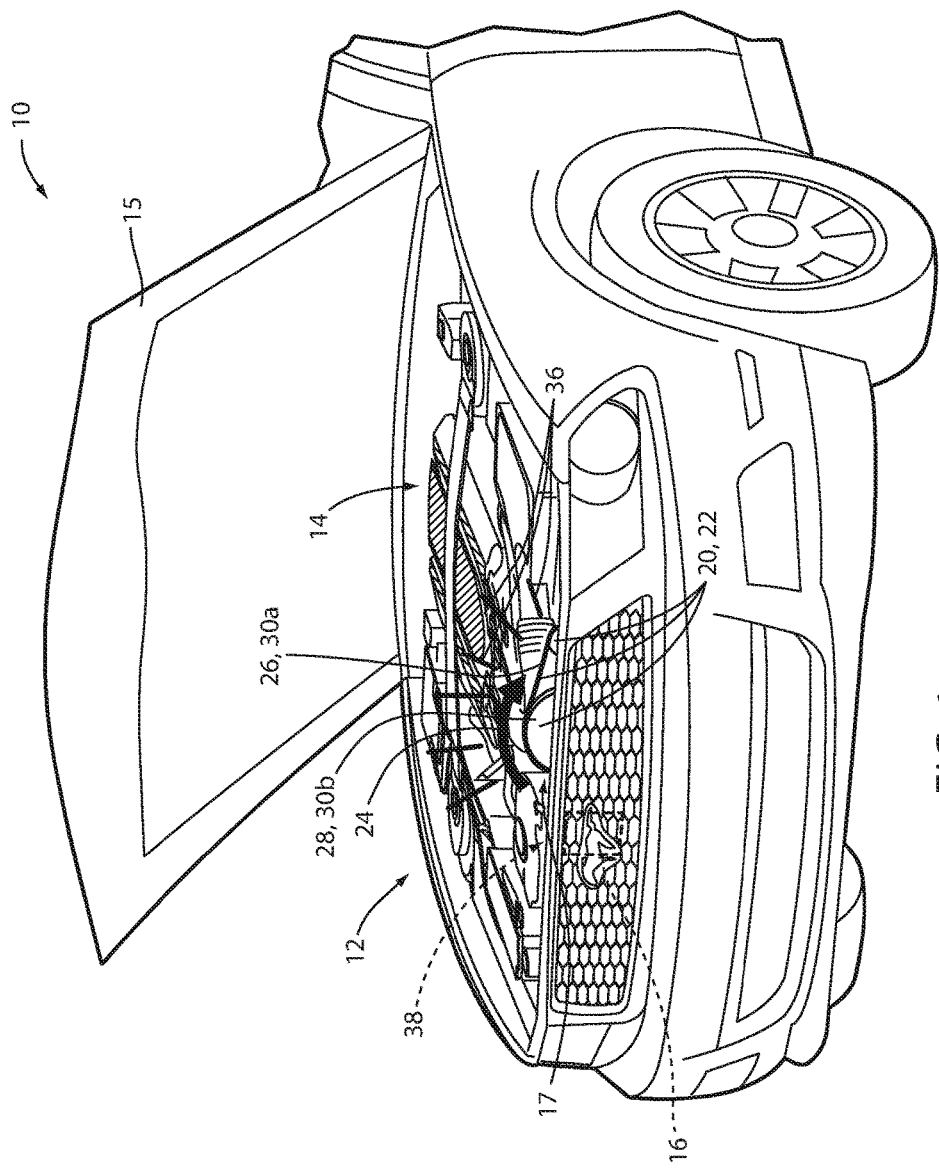
FIG. 1 is a perspective view of a vehicle comprising a lighting system.

Referring to FIG. 1, a perspective view of a vehicle 10 is shown demonstrating a lighting system 12 configured to illuminate at least a portion of an engine compartment 14. The lighting system 12 may be configured to selectively illuminate in response to an open or ajar status of a deck-lid 15 of the vehicle 10. In response to the open status of the deck-lid 15, a controller of the lighting system 12 may activate a light source 16, which may be disposed on an interior surface 17 within the engine compartment 14.

The lighting system 12 may further comprise at least one photoluminescent portion 20 disposed on a moving component 22 of the vehicle 10. The moving component 22 may correspond to a component in the engine compartment 14. The light source 16 may be configured to illuminate the moving component 22 in a periodic emission of light. The periodic emission of light may illuminate the moving component 22 such that a movement of the moving component is visually evident. In this configuration, the lighting system 12 may be configured to illuminate the moving component 22 in response the deck-lid 15 being opened and the moving component being visible or accessible to an onlooker.

The moving component 22 may correspond to a component, part, or assembly located proximate the engine compartment 14. The moving component 22 may move within the engine compartment 14 in a cyclic or rotating motion 24. The cyclic or rotating motion may comprise a period referred to herein as a component period. The moving component may correspond to a belt 26, pulley 28, gear, chain, blade, fan, related fixture, fastener, etc. When illuminated by the light source 16 at a lighting period different from the component period, the moving component 22 may appear to be moving in a visibly apparent progression. In this configuration, the lighting system 12 may be operable to alert an onlooker of a moving component proximate the engine compartment 14.

If illuminated with a conventional non-periodic or high frequency light source, the movement of the moving component 22 may be blurred such that the movement is not visually apparent due to a persistence of motion. For example, if the light source were non-periodic or had a frequency substantially exceeding the component period, the moving component 22 may appear stationary. The lighting system 12 may be configured to control the light source 16 to illuminate at a lighting period close to, but not equal to the component period to demonstrate a movement of the component 22. The movement of the component 22 may be apparent due to a strobe effect of the lighting period approaching the component period. In this way, the lighting system may illuminate the moving component and provide for the movement to be visually apparent to an onlooker.

In some embodiments, a plurality of the moving components 22 may comprise a plurality of the photoluminescent portions 20. Each of the photoluminescent portions 20 may be applied to or form a portion of any number of the moving components 22 and may incorporate various forms of photoluminescent structures. In an exemplary embodiment, the lighting system 12 may comprise a first photoluminescent portion 30a and a second photoluminescent portion 30b. Each of the photoluminescent portions 20 may emit output emissions 36 in one or more colors in response to receiving an excitation emission 38 from the light source 16.

The photoluminescent portions 20 may incorporate one or more photoluminescent structures configured to emit a specific color in response to receiving the excitation emission 38. In some implementations, a combination of photoluminescent structures may be utilized in the photoluminescent portions 20 to output various wavelengths corresponding to different colors of light. Accordingly, the lighting system 12 may provide various benefits including a cost-effective method for illuminating the moving components 22 proximate the engine compartment 14.

Figure 2A:
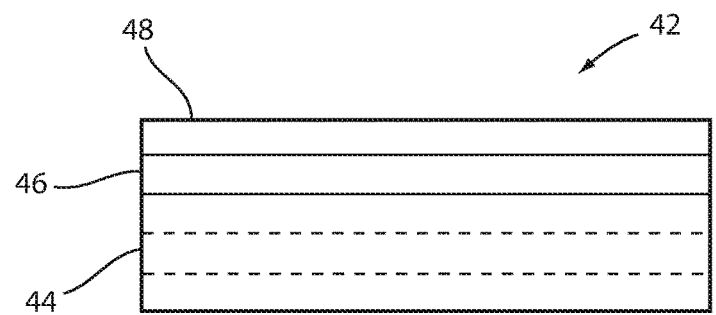
FIG. 2A illustrates a photoluminescent structure rendered as a coating.
Figure 2B:
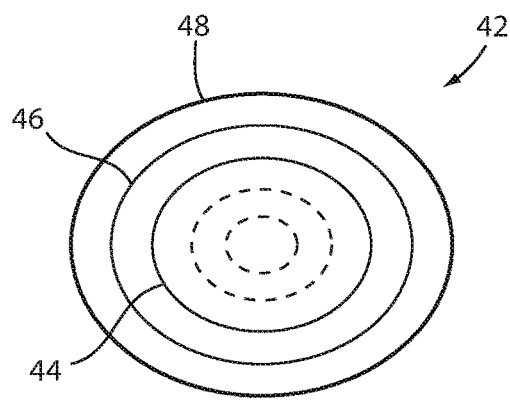
FIG. 2B illustrates the photoluminescent structure rendered as a discrete particle.
Figure 2C:
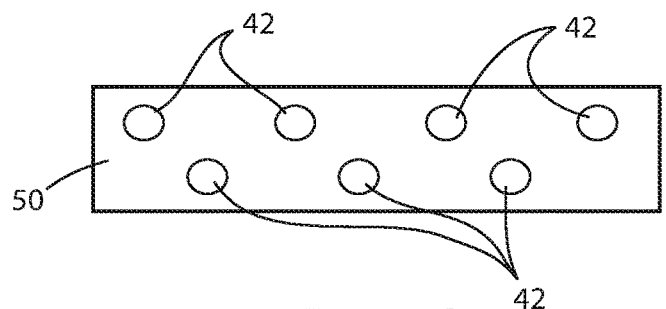
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle component (e.g. the moving component 22), a discrete particle capable of being implanted in a vehicle component, and a plurality of discrete particles incorporated into a separate structure capable of being applied to a vehicle component, respectively. The photoluminescent structure 42 may correspond to the photoluminescent portions 20 as discussed herein, for example the first photoluminescent portion 30a and the second photoluminescent portion 30b. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions 20 may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle component. The energy conversion layer 44 coating may be deposited on a vehicle component by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle component or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle component.

In some implementations, the photoluminescent structure 42 may be incorporated into a vehicle component as one or more discrete multilayered particles as shown in FIG. 2C. The photoluminescent structure 42 may also be provided as one or more discrete multilayered particles dispersed in a polymer formulation that is subsequently applied to a vehicle component or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
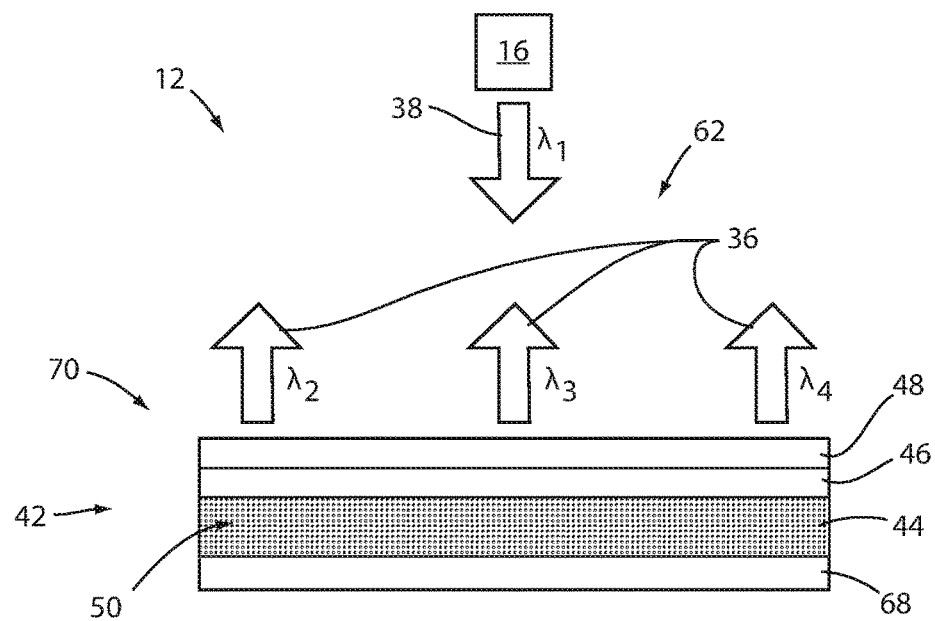
FIG. 3 illustrates a vehicle lighting system configured to convert a first emission of light to a second emission of light.

Referring to FIG. 3, the lighting system 12 is generally shown according to a front-lit configuration 62 to convert the excitation emission 38 from the light source 16 to the output emission 36. The excitation emission 38 may comprise a first wavelength $\lambda_1$, and the output emission 36 comprises a second wavelength $\lambda_2$. The lighting system 12 may include the photoluminescent structure 42 rendered as a coating and applied to a substrate 68 of the moving component 22. The photoluminescent structure 42 may include the energy conversion layer 44, and in some implementations may include the stability layer 46 and/or protective layer 48. In response to the light source 16 being activated, the excitation emission 38 is converted from the first wavelength $\lambda_1$ to the output emission 36 having at least the second wavelength $\lambda_2$. The output emission 36 may comprise a plurality of wavelengths $\lambda_2$, $\lambda_3$, $\lambda_4$ configured to emit significantly white light from the moving component 22.

In various implementations, the lighting system 12 comprises at least one energy conversion layer 44 configured to convert the excitation emission 38 at the first wavelength $\lambda_1$ to the output emission 36 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material. The red, green, and blue-emitting photoluminescent materials may be combined to generate the significantly white light for the output emission 36. Further, the red, green, and blue-emitting photoluminescent materials may be utilized in a variety of proportions and combinations to control the color of the output emission 36.

Each of the photoluminescent materials may vary in output intensity, output wavelength, and peak absorption wavelengths based on a particular photochemical structure and combinations of photochemical structures utilized in the energy conversion layer 44. As an example, the output emission 36 may be changed by adjusting the wavelength of the first emission $\lambda_1$ to activate the photoluminescent materials at different intensities to alter the color of the output emission 36. In addition to or alternatively to the red, green, and blue-emitting photoluminescent materials, other photoluminescent materials may be utilized alone and in various combinations to generate the output emission 36 in a wide variety of colors. In this way, the lighting system 12 may be configured for a variety of applications to provide a desired lighting color and effect for the vehicle 10.

The light source 16 may also be referred to as an excitation source and is operable to emit at least the excitation emission 38. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emission 38. The excitation emission 38 from the light source 16 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2$, $\lambda_3$, $\lambda_4$. The excitation emission 38 provides an excitation source for the energy conversion layer 44 by targeting absorption wavelengths of the various photoluminescent materials utilized therein. As such, the lighting system 12 is configured to output the output emission 36 to generate a desired light intensity and color.

Though the plurality to wavelengths is referred to as the wavelengths $\lambda_2$, $\lambda_3$, $\lambda_4$, the photoluminescent materials may be combined in various proportions, types, layers, etc. to generate a variety of colors for the output emission 36. The photoluminescent materials may also be utilized in a plurality of photoluminescent portions 20 distributed along a path of the excitation emission 38 to generate any number of emissions.

In an exemplary implementation, the light source 16 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting system 12 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting system 12 creates a visual effect of light originating from the photoluminescent structure 42. In this configuration, light is emitted from the photoluminescent structure 42 (e.g. the first photoluminescent portion 30a, the second photoluminescent portion 30b) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the conversion layer 44 to convert the first wavelength $\lambda_1$ to one or more wavelengths corresponding to a variety of colors.

Figure 4:
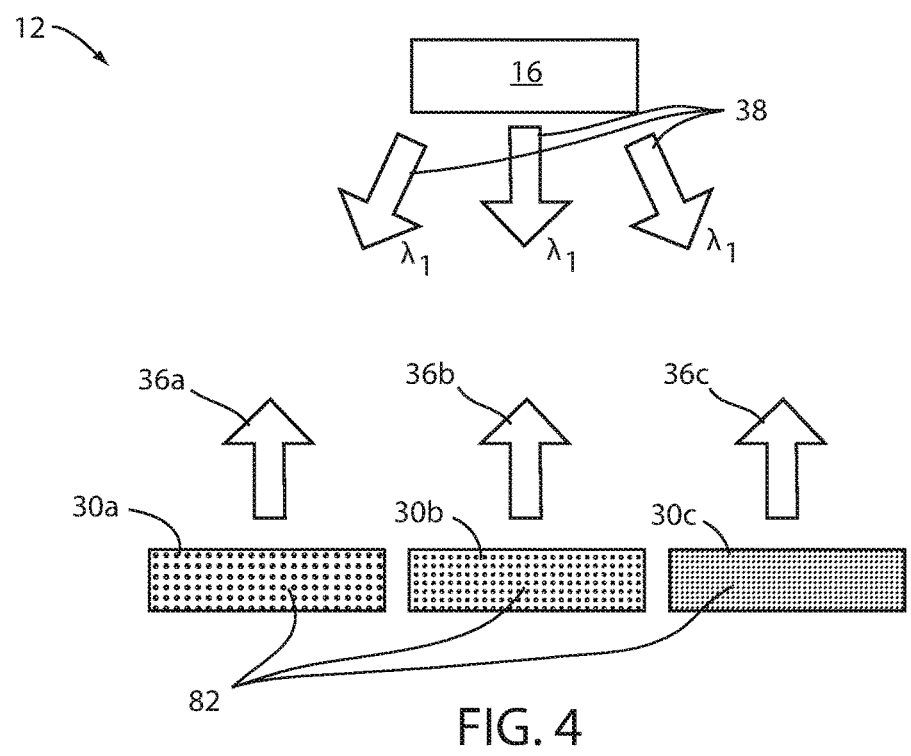
FIG. 4 illustrates the vehicle lighting system configured to convert a first emission of light to a plurality of emissions of light.

Referring to FIG. 4, the light system 12 is shown in a front-lit configuration. In an exemplary implementation, the light source 16 may be configured to emit the excitation emission 38 toward the plurality of photoluminescent portions 20. In this example, the plurality of photoluminescent portions 20 comprises the first photoluminescent portion 30a, the second photoluminescent portion 30b and may further comprise a third photoluminescent portion 30c. Each of the photoluminescent portions 20 may be configured to convert the first wavelength $\lambda_1$ of the excitation emission 38 to one or more of the plurality of wavelengths $\lambda_2$, $\lambda_3$, $\lambda_4$. In this way, the excitation emission 38 may be converted into a plurality of output emissions originating from each of the photoluminescent portions 20 to generate a multicolored lighting effect.

For example, the first photoluminescent portion 30a may comprise photoluminescent materials in a conversion layer configured to generate a first output emission 36a. The second photoluminescent portion 30b may comprise photoluminescent materials in a conversion layer configured to generate a second output emission 36b. The third photoluminescent portion 30c may comprise photoluminescent materials in a conversion layer configured to generate a third output emission 36c. Similar to the energy conversion layer 44, discussed in reference to FIG. 3, photoluminescent materials configured to emit light of various colors may be utilized in a variety of proportions and combinations to control the output color of each of the output emission 36. Based on a desired lighting effect, each of the output emissions 36 may comprise photoluminescent material configured to emit light having substantially similar colors, or a wide variety of color combinations.

To achieve the various colors and combinations of photoluminescent materials described herein, the lighting system 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2012, all of which are included herein by reference in their entirety.

Figure 5A:
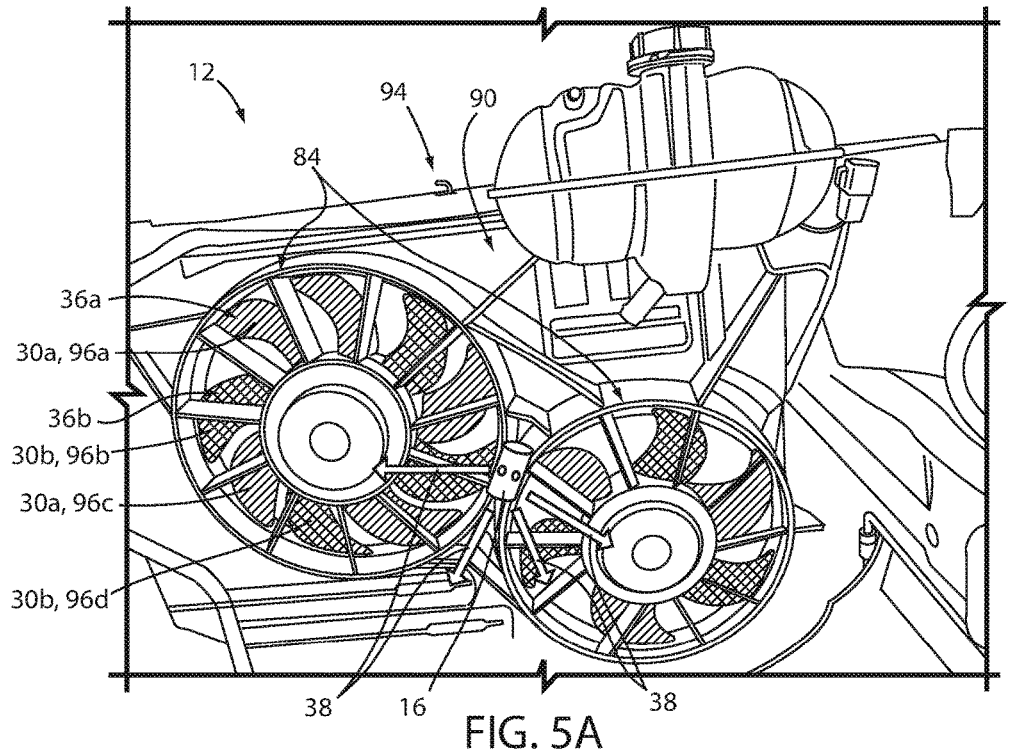
FIG. 5A is a perspective view of a vehicle engine compartment having a lighting apparatus configured to illuminate a moving component.
Figure 5B:
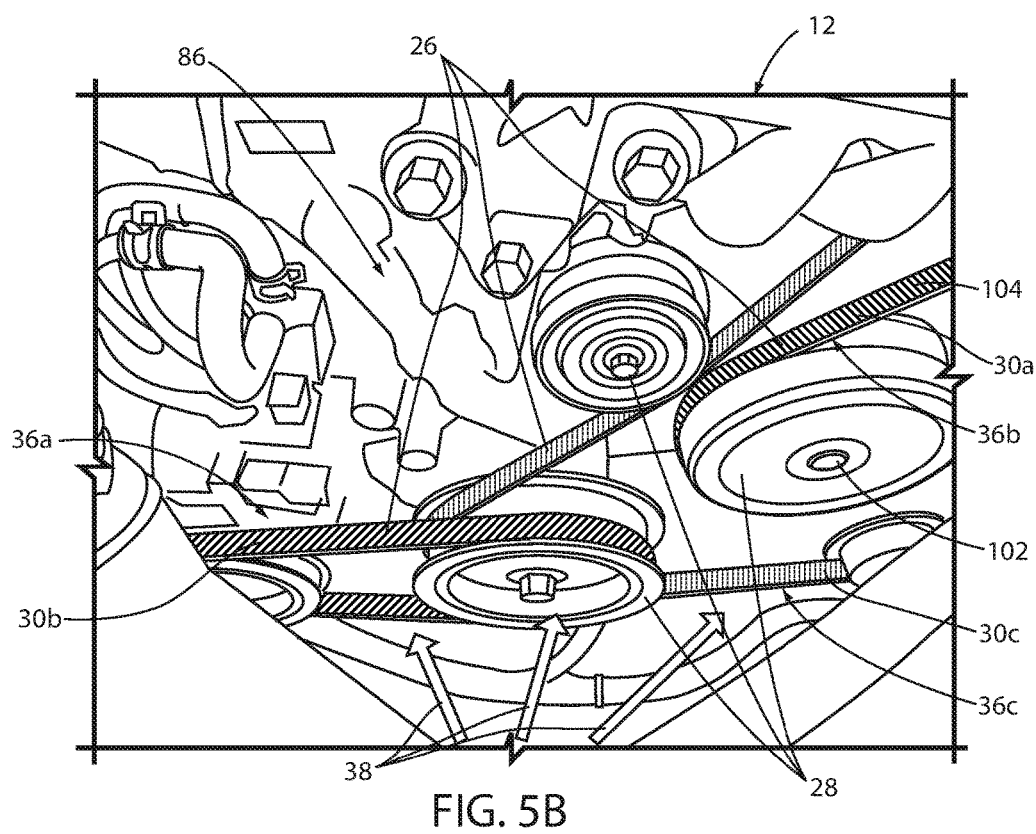
FIG. 5B is a perspective view of a vehicle engine compartment having a lighting apparatus configured to illuminate a moving component.

Referring to FIGS. 5A and 5B, perspective views of a cooling fan 84 and an engine block 86 disposed in the engine compartment 14 of the vehicle 10 are shown, respectively. As previously discussed, the light source 16 may be activated by a controller of the lighting system 12 to illuminated one or more of the moving components 22 at a lighting period. In the exemplary embodiment demonstrated in FIGS. 5A and 5B, the light source 16 is disposed on a surface located inside the engine compartment 14 proximate the cooling fan 84 or a radiator 90. Accordingly, the light source 16 may be disposed proximate an opening or space formed between the radiator 90 and engine block 86. In some embodiments, the light source 16 may be disposed proximate a grill, or a hood latch 94, or various surfaces from which the excitation emission 38 may illuminate the cooling fan 84 and/or the belt 26, pulley 28, or various moving components 22.

The controller may be configured to control the lighting period of the light source 16 such that a movement of the moving component 22 is visually evident. The moving component 22 may move within the engine compartment 14 in a cyclic or rotating motion 24 corresponding to the component period. The motion of the moving component may have a substantially consistent speed that may be related to an engine timing of the engine of the vehicle 10. When illuminated by the light source 16 at a lighting period different from the component period, the moving component 22 may appear to be moving in a visibly apparent progression. In this configuration, the lighting system 12 may be operable to alert an onlooker of a moving component proximate the engine compartment 14.

If illuminated with a conventional non-periodic or high frequency light source, the movement of the moving component 22 may be blurred such that the movement is not visually apparent due to a persistence of motion. Accordingly, the lighting system 12 may be configured to control the light source 16 to emit the excitation emission 38 at a lighting period close to, but not equal to the component period to demonstrate a movement of the component 22. The movement of the component 22 may be apparent due to a strobe effect of the lighting period approaching the component period. In this way, the lighting system 12 may illuminate the moving component 22 and provide for the movement to be visually apparent to an onlooker.

In some embodiments, one or more of the moving components 22 may comprise the plurality of photoluminescent portions 20. For example, at least one cooling fan 84 may comprise a plurality of fan blades 96. Each of the fan blades may comprise a photoluminescent portion. In an exemplary embodiment, the plurality of fan blades 96 may comprise the first photoluminescent portion 30a corresponding to a first blade 96a and alternated with the second photoluminescent portion 30b corresponding to a second blade 96b. The photoluminescent portions may be alternated in this way over the plurality of fan blades comprising a third blade 96c comprising the first photoluminescent portion 30a, a fourth blade 96d comprising the second photoluminescent portion 30b, and so on. In this configuration, the lighting system 12 may be configured to illuminate the fan blades in a first color corresponding to the first output emission 36a and a second color corresponding to the second output emission 36b moving about the cooling fan 84 to emphasize or provide a dazzling visual effect illuminating the motion of the fan blades 96.

The plurality of photoluminescent portions 20 may similarly be applied to a plurality of belts 26, pulleys 28, fasteners 102 or various additional moving components 22 of the vehicle. For example, the belts 26 may comprise the third photoluminescent portion 30c disposed on an exterior surface 104 and/or embedded in a material of the belt 26. In this configuration, the controller may illuminate the light source 16 to emit the excitation emission 38. In response to receiving the excitation emission 38, the third photoluminescent portion 30c may emit the third output emission 36c.

The excitation emission 38 may be activated at the lighting period, which may have a frequency greater than or less than the component frequency or rotational frequency of the pulleys 28. In this way, the movement of the belts 26 and pulleys 28 may be visually apparent to an onlooker.

The system 12 may control the lighting period to emphasize the visual appearance of the moving components 22 as a result of a stroboscopic effect. The stroboscopic effect may cause aliasing by representing the motion of the moving components 22 by a series of samples. In other words, the light source may provide for a sampled view of the moving components 22 such that their motion does not exceed a motion persistence threshold where the component frequency causes the appearance of the moving components 22 to blur together for an onlooker. In this way, the system 12 may enhance the visibility of the motion of the moving components 22 by illuminating the components to sample the motion of the component frequency.

For example, if the moving components 22 have a component frequency of 80 Hz, a lighting frequency of 81-90 Hz may enhance an appearance of the motion in a reverse direction. Similarly, a lighting frequency of 70-79 Hz may enhance an appearance of the motion in a forward direction. In this way, the light source 16 may be activated at the lighting frequency to enhance the visual appearance of the moving objects 22. The enhancement provided by the system 12 may be provided by aliasing or sampling the motion of the moving objects 22 to avoid the effect of persistence of motion, which may cause the motion to be obscured.

In various embodiments, the controller 12 may be configured to control the lighting frequency as being somewhat greater than or less than the component frequency. As discussed herein, the lighting frequency is also described as being substantially close to or approaching the component frequency without being equal to the component frequency. In general, if the lighting frequency is greater or less than the component frequency, the moving component 22 may appear to be advancing forward or moving in reverse. The rate of the apparent motion may be a function of a difference between the lighting period and the component period. The desired appearance of the apparent motion of the moving component 22 may vary for different applications. For example the controller may activate the lighting period from at approximately 1-20% of the component period depending on a desired visual effect. Accordingly, the system 12 may be utilized to illuminate the moving components 22 such that the motion is apparent and an onlooker is notified of the moving component 22.

The percent range between the component period and the lighting period may also be set to a harmonic frequency of the component period. In such applications, the component frequency may be multiplied and the lighting frequency may be offset from the multiplied component frequency to demonstrate the motion of the moving component 22. Accordingly, various lighting frequencies of the light source may cause the moving components to appear to be moving. Based on a desired appearance of a rate of the motion of the moving components 22, the lighting frequency of the light source may be set at different rates as discussed herein. Additionally in some embodiments, a plurality of component frequencies may correspond to each of a plurality of the moving components 22. In such applications, a plurality of light sources similar to the light source 16 may be controlled at a plurality of lighting frequencies to illuminate the one or more photoluminescent portions 20 to demonstrate the motion of each of the moving components 22.

Figure 6:
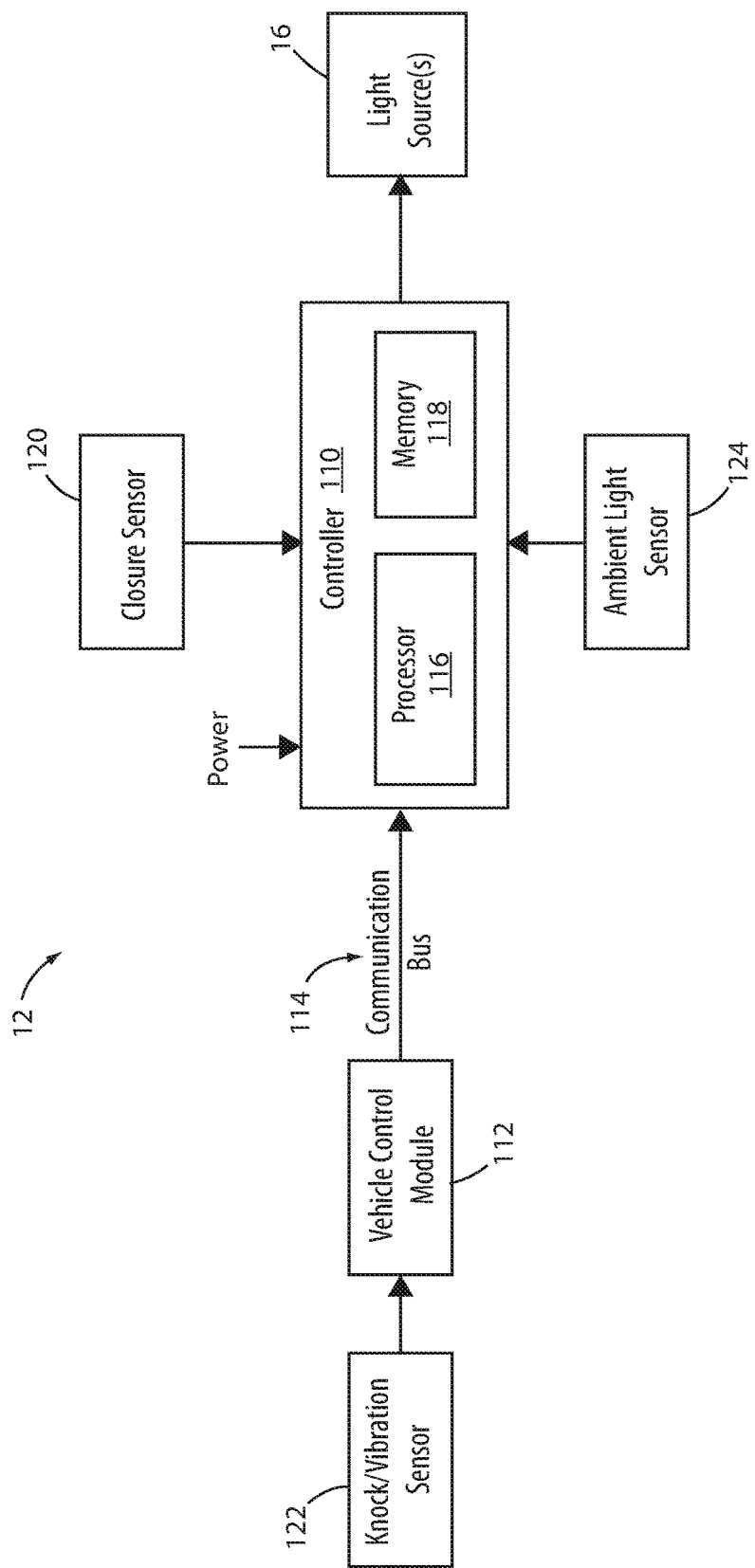
FIG. 6 is a block diagram of a system configured to illuminate a moving component in an engine compartment.

Referring now to FIG. 6, a block diagram of the lighting system 12 is shown. The lighting system 12 may comprise the controller 110 configured to control the light source 16. The controller 110 may be in communication with a vehicle control module 112 via a communication bus 114 of the vehicle 10. The communication bus 114 may be configured to deliver signals to the controller 110 identifying various states of the vehicle 10. For example, the communication bus 114 may be configured to communicate an operating condition of the vehicle 10 (e.g. the ignition is active), an ambient light level, a door ajar signal, a gear selection, a door lock/unlock event, an open or closed status of engine compartment 14 or any other information or control signals that may be communicated via the communication bus 114. In this way, the controller 110 may selectively activate the active light source 16 in response to one or more conditions communicated by the vehicle control module 112.

The controller 110 may include a processor 116 comprising one or more circuits configured to receive the signals from the communication bus 114 and output signals to control the light source 16 as discussed herein. The processor 116 may be in communication with a memory 118 configured to store instructions to control the activation of the light source 16. The processor 116 may receive various signals and/or messages corresponding to vehicle conditions via the communication bus 114. In this way, the controller 110 may be configured to receive an indication of an ajar status of the deck-lid 15 of the vehicle 10 communicated via a status signal communicated via from closure sensor 120.

The closure sensor 120 may correspond to a proximity sensor and/or presence sensor utilizing various forms of technology to detect the ajar status of the deck-lid 15. For example, the closure sensor 120 may correspond to a capacitive sensor, inductive sensor, laser or optical based sensor, or any suitable form of sensor that may detect the open state of the deck-lid 15. The closure sensor may be in direct communication with or integrated with the controller 110, and may also be in communication with the controller via the control module 112 via the communication bus 114. As discussed herein, the lighting system may be implemented in a variety of ways to provide for various configurations without departing from the spirit of the disclosure.

The controller 110 may be configured to control the lighting period of the light source 16 such that a movement of one or more of the moving components 22 is visually evident. The motion of the moving component may have a substantially consistent speed that may be related to an engine timing of the engine of the vehicle 10. Accordingly, the controller 110 may be programmed to periodically illuminate the light source 16 at a lighting period different or asynchronous from the component period of the moving component 22. In this way, the lighting system 12 may be configured to illuminate the moving component 22 to appear to be moving in a visibly apparent progression. In this configuration, the lighting system 12 may be operable to alert an onlooker of a moving component proximate the engine compartment 14.

In some embodiments, the controller 110 may be utilized to illuminate that light source 16 for a diagnostic process. For example, in response to a user input via the communication bus 114, the controller 110 may activate a diagnostic mode. In the diagnostic mode, the controller 110 may control the lighting frequency to align with a recommended idle speed. The timing of the recommended idle speed may be communicated from the control module 112 to the controller 110. In this configuration, the controller 110 may selectively activate the light source 16 at a frequency configured to illuminate the moving components 22 at the recommended idle speed. Accordingly as the light source 16 is illuminating the moving components at the recommended speed, the moving components 22 (e.g. the belts 26, pulleys 28, etc.) may appear to be stationary if engine is operating at the recommended speed. In this way, the lighting system 12 may be operable to utilize as a visual indication of the engine timing settings for the vehicle 10 being optimal.

In some embodiments, the system 12 may further be utilized to diagnose an engine vibration. For example, is some embodiments, the controller may be in communication with a knock sensor 122 via the control module 112. The knock sensor 122 may be configured to detect a vibration frequency of the engine. The controller 110 may be activated by the control module 112 to activate the light source 16 at the vibration frequency. By illuminating the light source 16 at the vibration frequency identified by the knock sensor 122, the controller 110 may provide for a visual indication to help diagnose the vibration detected by the control module 112.

The controller 110 may further be in communication with an ambient light sensor 124. The ambient light sensor 124 may be configured to communicate a signal to the controller 110 such that the controller 110 may identify the ambient light level proximate the vehicle 10. The light sensor 124 may correspond to various forms of sensors, for example charge coupled devices CCDs, photodiodes, etc. Based on the input from the sensor 124, as well as communications received via the closure sensor and the communication bus 114, the controller 110 may selectively activate each the light source 16 at a desired intensity based on various states of the vehicle 10.

The ambient light sensor 124 may be operable to communicate a light condition, for example a level brightness or intensity of the ambient light proximate the vehicle 10. In response to the level of the ambient light, the controller 110 may be configured to adjust a light intensity of the excitation emission 38 of the light source 16. In this way, the intensity of the light output from light source 16 and the photoluminescent portions 20 may be adjusted by controlling a duty cycle, current, or voltage supplied to the light source 16 from controller 110.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination apparatus for a vehicle comprising:
   a photoluminescent portion disposed on a component configured to move during operation; and
   a light source located in a vehicle engine compartment, the light source configured to emit an excitation emission configured to illuminate the photoluminescent portion at a frequency corresponding to the motion of the component, wherein the frequency is configured to emphasize the motion of the component.

2. The apparatus according to claim 1, wherein the component is disposed in the vehicle compartment.

3. The apparatus according to claim 1, wherein the motion of the component defines a component period.

4. The apparatus according to claim 3, wherein the component period defines a rate of a cyclic motion of the component.

5. The apparatus according to claim 1, wherein the frequency is timed to illuminate the component asynchronous to the component period.

6. The apparatus according to claim 1, wherein the component corresponds to at least one of a fan, a belt, a pulley, and a fastener.

7. A lighting apparatus for a vehicle comprising:
   a light source disposed in an engine compartment;
   a controller in communication with an engine control module configured to identify a component timing detected in the engine; and
   a moving component controlled by the engine, wherein the controller activates the light source at the component timing in a diagnostic mode.

8. The apparatus according to claim 7, wherein the controller is configured to create a stroboscopic effect illuminating the moving component at the component timing.

9. The apparatus according to claim 8, wherein the stroboscopic effect causes the moving component to appear as though it is stationary.

10. The apparatus according to claim 7, further comprising a photoluminescent portion disposed on the moving component.

11. The apparatus according to claim 10, wherein the photoluminescent portion is configured to illuminate in response to receiving light from the light source.

12. The apparatus according to claim 1, wherein the component timing corresponds to a vibration detected by a knock sensor of the engine.

13. The apparatus according to claim 12, wherein the moving component corresponds to a faulty component causing the vibration.

14. A lighting apparatus for a vehicle comprising:
    a light source disposed proximate an engine compartment configured to output an emission to illuminate a component moving at a cyclic rate within the engine compartment; and
    a controller configured to selectively illuminate the light source at a lighting frequency, wherein the lighting frequency is configured to generate a strobe effect configured to create a sampled illumination of the component.

15. The apparatus according to claim 14, wherein the light frequency is timed at a rate different from the cyclic rate.

16. The apparatus according to claim 14, wherein the strobe effect illuminates a portion of the moving component at various stages along a repeated path.

17. The apparatus according to claim 14, further comprising a photoluminescent portion disposed on the moving component.

18. The apparatus according to claim 14, wherein the light source is located proximate a cooling fan of the vehicle.

19. The apparatus according to claim 14, wherein the component corresponds to at least one of a cooling fan, a belt, a pulley, and a fastener.

* * * * *